W. S. BEASLEY.
PLANT SUPPORT.
APPLICATION FILED FEB. 25, 1909.
936,402.
Patented Oct. 12, 1909.
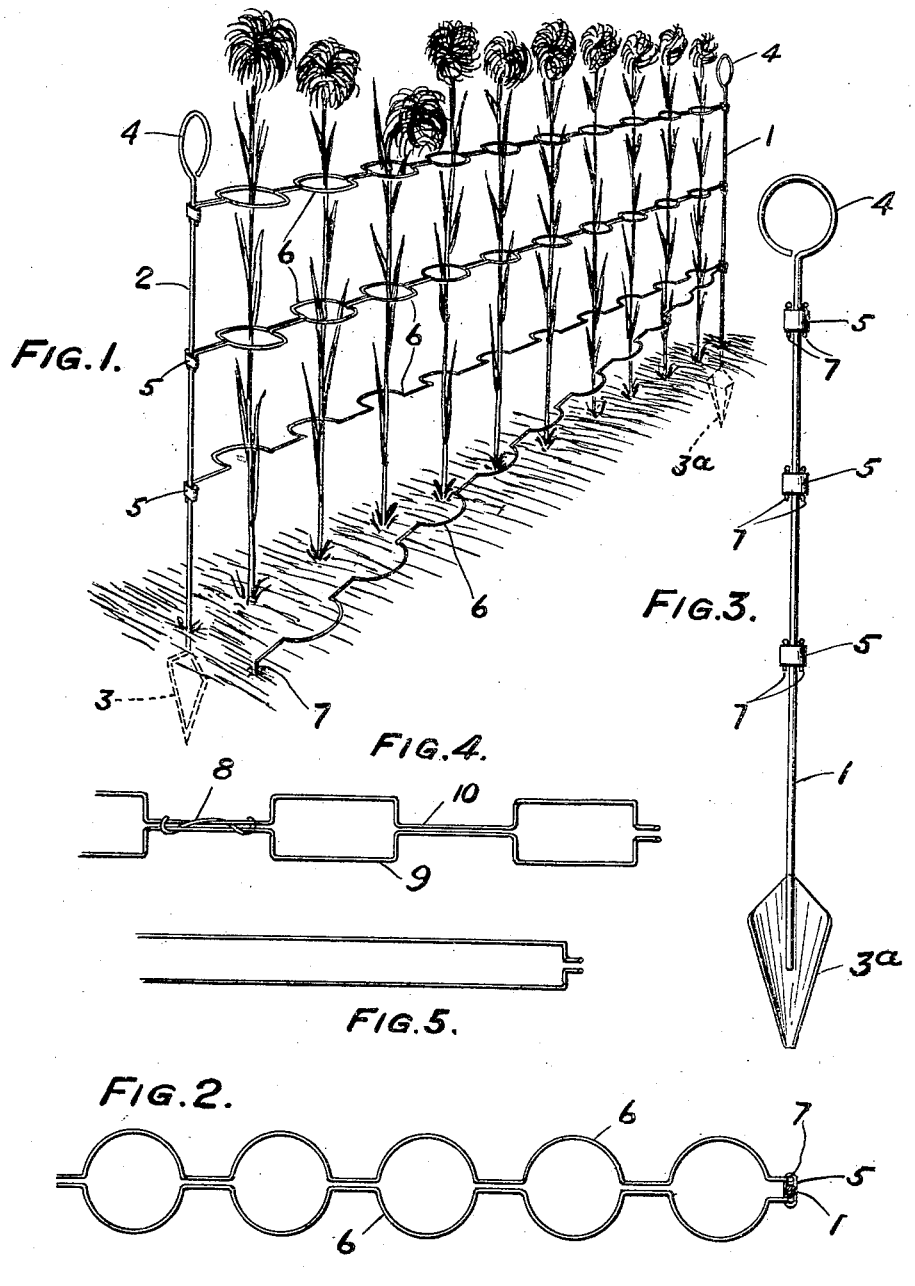

UNITED STATES PATENT OFFICE.

WILLIAM S. BEASLEY, OF PHILADELPHIA, PENNSYLVANIA.

PLANT-SUPPORT.

936,402.  Specification of Letters Patent.  Patented Oct. 12, 1909.

Application filed February 25, 1909. Serial No. 479,988.

*To all whom it may concern:*

Be it known that I, WILLIAM S. BEASLEY, a citizen of the United States, and a resident of Germantown, in the county and city of Philadelphia and State of Pennsylvania, have invented a new and useful Plant-Support, of which the following is a specification.

The principal objects of the present invention are, first, to provide a simple, convenient, comparatively inexpensive and efficient support adapted for use in greenhouses and out of doors, for supporting plants of various kinds, and second, to provide a plant support which can be rapidly and easily applied to the plants without having resort to tying them and which does not interfere with either cultivation and growth of the plants or the gathering of the flowers.

The invention will be claimed at the end hereof, but will first be described in connection with the embodiments of it chosen for illustration in the accompanying drawings, and in which—

Figure 1, is a perspective view illustrating a plant holder embodying features of the invention, in application to a row of plants. Fig. 2, is a top or plan view, partly in section, illustrating the plant holder shown in Fig. 1. Fig. 3, is an end view, partly in section, showing a modified form of stake. Fig. 4, is a top or plan view illustrating a modification of the invention and showing a clip. Fig. 5, is a similar view illustrating another modification, and Fig. 6, is a side view illustrating another modification.

In the drawings 1 and 2 are stakes of suitable material and construction. They may be of wood or metal; those shown are preferably of metal.

3, is a pointed base or end piece for the stake and in Fig. 1 it is shown as made by bending the wire which constitutes the stake. In Fig. 3, the base 3ª is shown as made of metal suitably connected with the end of the stake.

4, are rings which may or may not be provided, and when present, they serve as a handle and also as a means by which the stakes can be hung up. The stakes are provided with lateral eyes or sockets 5, conveniently arranged along them; the number of the sockets may be increased or diminished and of course the stakes as well as the other parts to be hereinafter described may be made of convenient sizes and lengths.

6, are rods or stringers and they extend between the stakes and are provided at their ends with hooks or feet 7, adapted for detachable attachment to the eyes or sockets 5. The eyes or sockets and the feet or hooks are examples of detachable connections and the terms sockets or eyes and feet or hooks are not intended to limit the invention to the exact construction shown in the drawings. The rods or stringers are arranged in pairs with space between them. As shown in Fig. 2 and also in Fig. 4 the rods or stringers are correspondingly offset so that the space is subdivided and each subdivision may contain a single plant, as is shown in the drawings, although it may contain more than one plant. In Fig. 2, the spaces are circular, whereas in Fig. 4, they are rectangular. In Fig. 5, the rods or stringers are offset at their ends so that there is one continuous space between them. As shown in Fig. 6, the rods or stringers between the spaces are twisted together forming loops and the feet or hooks lie in substantially the same plane as the plane of the loops, so that in this construction the pair of rods or stringers lie vertically and are useful for vines and such plants. As shown in the other figures the pair of rods or stringers lie in horizontal plane and are intended for use in connection with such plants as carnations, snapdragons and the like.

8, is a clip consisting of a piece of metal having hooks at its ends which may engage one of the rods or stringers 9, while the body of the clip passes around the other rod or stringer 10. This clip, when present, serves to keep the rods or stringers in position, although the clip is not necessary in all cases and the invention is not confined to the precise form of clip shown in the drawings.

In use the stakes are placed at the ends of a row of plants and they therefore do not interfere with the cultivation of the plants. The rods or stringers are then connected with the stakes and in cases where the rods or stringers of each pair are separable, for example as in Figs. 2, 4, and 5, one of the rods of the pair may be secured at its ends to each stake and the other rod may be secured first at one of its ends to a stake, as shown in Fig. 1, and then the free end brought up to the other stake and in this way the plants are easily placed between the two rods or stringers, which serve to support them without need of tying. The absence of all tying is a desirable feature not only because of the time it takes to tie up plants, but also because it permits of the easy picking of the flowers. It is evident that the described device saves a great deal of labor because it can be readily applied to the plants and this item is particularly important in the case of green-houses.

What I claim is:

1. A plant support comprising stakes having rods arranged between them and offset at intervals to provide spaces, and a detachable clip for binding together the parts of the rods between the offsets, substantially as described.

2. A plant support comprising in combination a pair of single stakes each provided with lateral eyes and rods arranged in pairs and extending between the stakes and having at each of their ends hooks detachably engaging said eyes, each rod being correspondingly offset to form plant spaces and said rods being in close proximity with each other between the offsets, substantially as described.

3. A plant support comprising in combination a pair of stakes each consisting of a single standard, rods arranged in pairs and extending between the stakes, each rod being correspondingly offset to form plant spaces and said rods being in close proximity with each other between the offsets, and hooks and eyes for detachably connecting the ends of each of the rods and stakes whereby the rods may be separated to get the plants between them.

In testimony whereof I have hereunto signed my name.

WILLIAM S. BEASLEY.

In the presence of—
  GEO. S. WERTSUER,
  FRANK B. SCAIFE.